May 27, 1941.  C. A. OTTO  2,243,647
AIR CONDITIONING CONTROL
Filed March 23, 1938  4 Sheets-Sheet 2

Inventor
Carl A. Otto
By Dodge and Ins
Attorneys

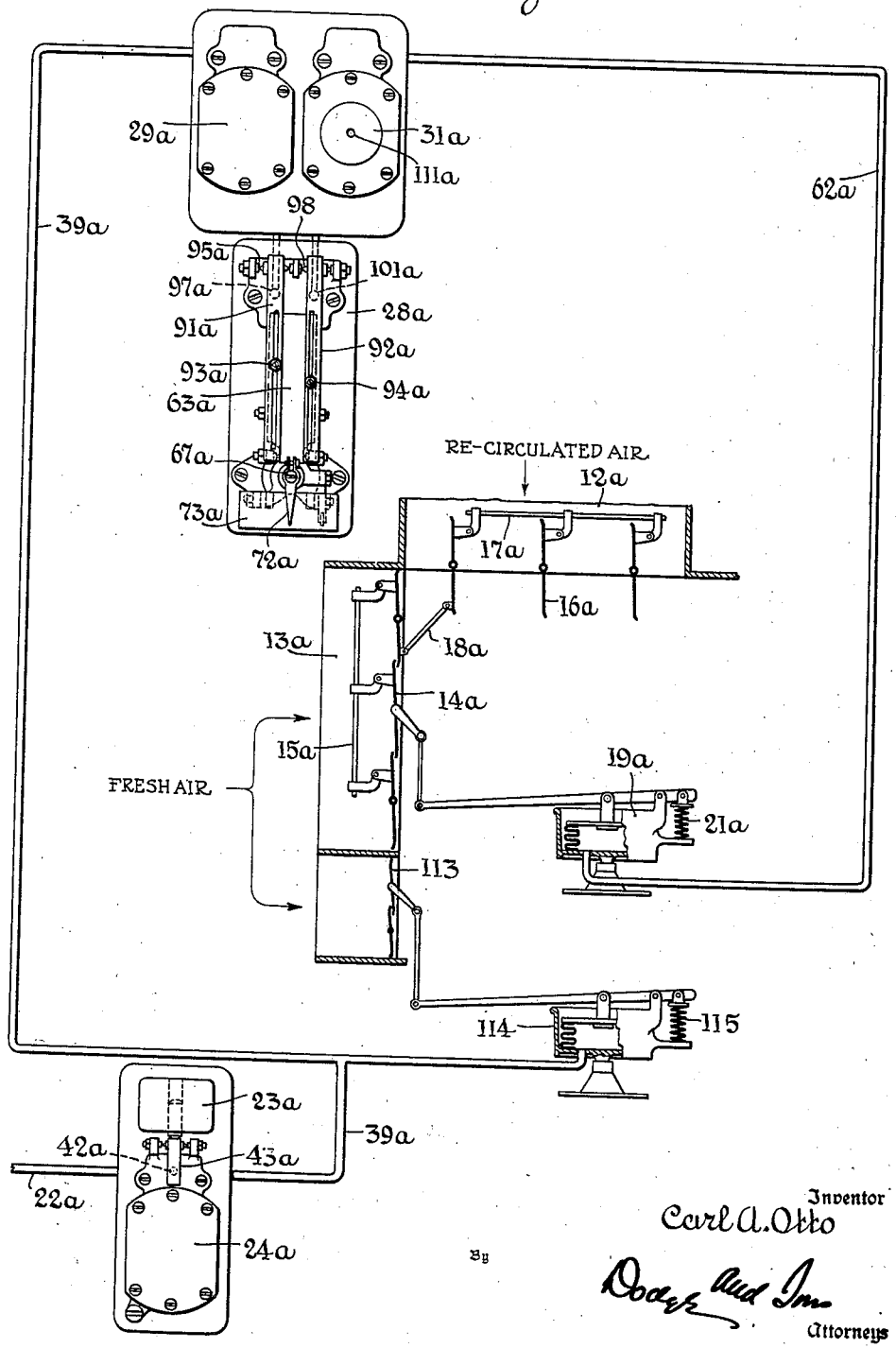

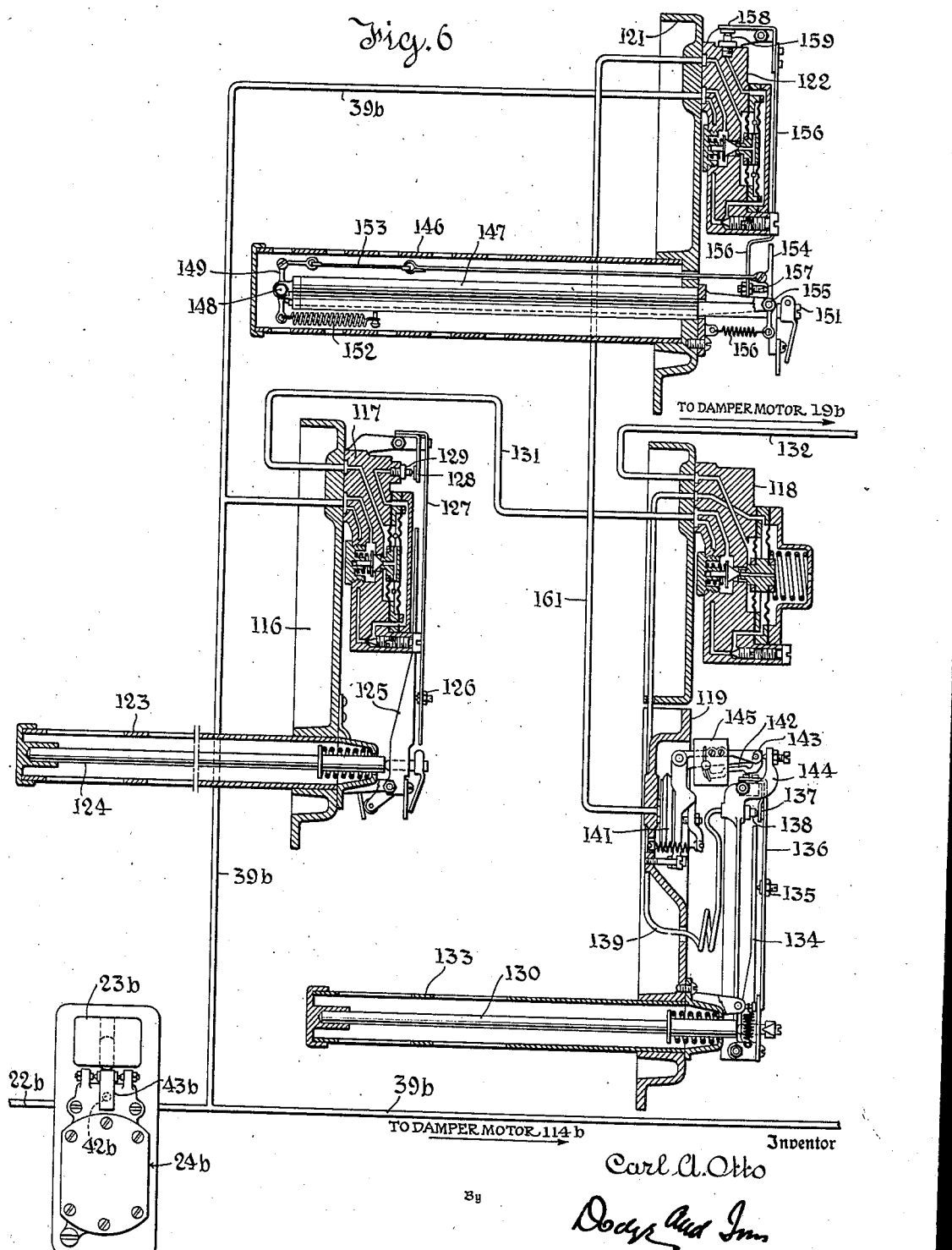

Patented May 27, 1941

2,243,647

UNITED STATES PATENT OFFICE 2,243,647

AIR CONDITIONING CONTROL

Carl A. Otto, Milwaukee, Wis., assignor to Johnson Service Company, Milwaukee, Wis., a corporation of Wisconsin Application March 23, 1938, Serial No. 197,707

14 Claims. (Cl. 236—44)

This invention relates to air conditioning of the year-round type and particularly to automatic controls for such systems, adapted to give economical operating conditions, when the heating and cooling units are operating under low load conditions, as well as satisfactory control under intermediate (between seasons) conditions when both heating and cooling units are inactive.

The control has particularly to do with proportioning of fresh and recirculated air. Under winter conditions the load on the plant is such that only a limited amount of fresh air can be used. Under hot weather conditions the same is true. The invention provides means to insure the flow of a minimum quantity of fresh air whenever the circulating fan is running; means to shut off this flow when the fan is shut down, and means (if desired) to adjust the minimum flow manually from time to time.

More important however, is an automatic control which responds to the condition of outside (fresh) air, i. e., the combined effect of outdoor dry bulb temperature and relative humidity, and adjusts the fresh air dampers and recirculated air dampers concurrently but in reverse senses, so that when outside air conditions are in a range approximating (within chosen limits) the desired indoor conditions, the fresh air dampers are wide open and the recirculated air dampers closed. Similarly in zones above and below these limits requiring cooling or heating only in moderate degree, the fresh air dampers are closed progressively and the recirculated air dampers are concurrently opened progressively, each in proportion to departure of outside air from desired indoor conditions, so as to use the maximum fresh air economically permissible.

Since the use of the maximum practicable quantity of fresh air is generally considered desirable as a health measure, the system offers definite advantages from the standpoints of health and economy.

The invention here claimed is not directed to automatic control of the conditioning units proper, and no such controls are shown. It should be understood, however, that use of any suitable system for this purpose is contemplated.

For illustrative purposes three embodiments of the inventive concept are shown in the accompanying drawings, in which:

Fig. 3 is a view, similar to Fig. 1 showing a modified arrangement;

Fig. 4 is a view similar to Fig. 2 but illustrating the control mechanism for Fig. 3;

Fig. 5 is a view similar to Fig. 1, showing another modified arrangement; and

Fig. 6 is a view similar to Fig. 2 but illustrating the control mechanism of Fig. 5.

Figure 1:
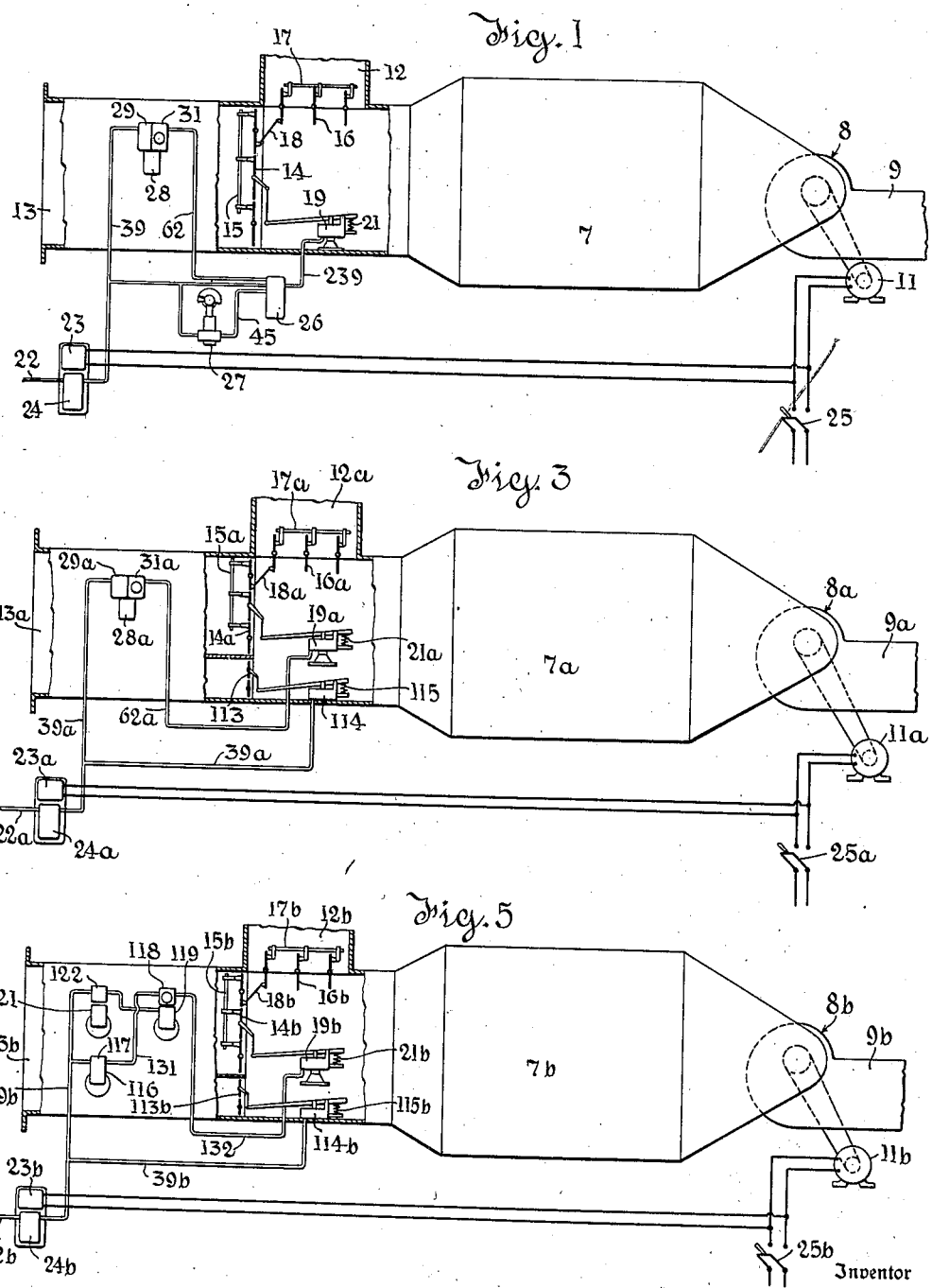
Figure 1 is a diagram of the system showing fresh and recirculated air connections, the conditioner, the fan and the location of the control units.

Referring first to Fig. 1, the conditioner is conventionally indicated at 7, the circulating fan (total volume fan) at 8, the duct leading to the conditioned space (or spaces) at 9, the motor driving the fan at 11, the return air duct at 12, and the fresh air duct at 13.

To conserve space on the drawings, the conditioned space is not shown, but as is common in this art, it may be a single space fed by duct 9, or what is more usual, a plurality of spaces fed by branches of duct 9. From such space or spaces there are return air connections connected to duct 12. Duct 13 leads from out-of-doors.

The proportioning of fresh air is controlled by a set of louver dampers 14 controlling fresh air, connected to move in unison by rod 15, and a set of return air louver dampers 16 connected to move in unison by rod 17, the two sets being connected to move simultaneously in reverse senses by link 18. A motor 19 operates both sets through suitable linkage conventionally indicated, and includes a return spring 21 which biases the dampers to a position in which the fresh air dampers are closed and the recirculated air dampers are wide open.

Control instruments of the pneumatic type are used and 22 is the air supply line for the pneumatic instruments. These will be described in some detail but should be first identified and their general functions stated.

A magnet valve comprising a winding 23 and relay 24 controls the supply of air to the control system. Winding 23 is connected to be energized when motor 11 is energized by switch 25. The simplest circuit diagram possible has been used to indicate the relation. When the fan motor runs, winding 23 is excited and relay 24 supplies motor air to the control system. When the motor is stopped the deenergization of winding 23 causes relay 24 to cut off the supply of motive air and vent the system, so that dampers 14, 16 assume the position of Fig. 1.

The cumulator 26 is a special type of relay controlled in part by a pressure regulating valve 27 (called in the trade a gradual switch). The adjustment of the gradual switch 27 determines the minimum pressure which may be established in motor 19 by the cumulator 26 and hence establishes chosen limits on the closing movement of the fresh air dampers 14.

The control exercised on cumulator 26 by gradual switch 27 is secondary and merely limiting. The primary control on the cumulator is exercised by a two point comfostat 28 of the insertion type, subject to fresh air flowing through duct 13 and operating through a direct acting relay 29 and reverse acting relay 31 connected in series and serially controlled by the comfostat.

The arrangement is such that as the conditions of fresh air vary between one requiring moderate heating with minimum permissible fresh air, and another requiring moderate cooling with minimum permissible fresh air, the fresh air dampers gradually open wide as the need for heating diminishes, then remain open through a range in which neither heating nor cooling is necessary and then gradually close as the need for cooling increases.

The reversal of action with dwell between opposite actions is secured by the use of the reversely acting relays 29 and 31 and the dwell is secured by timing the closing of their respective leak ports with respect to the movements of the comfostat.

Figure 2:
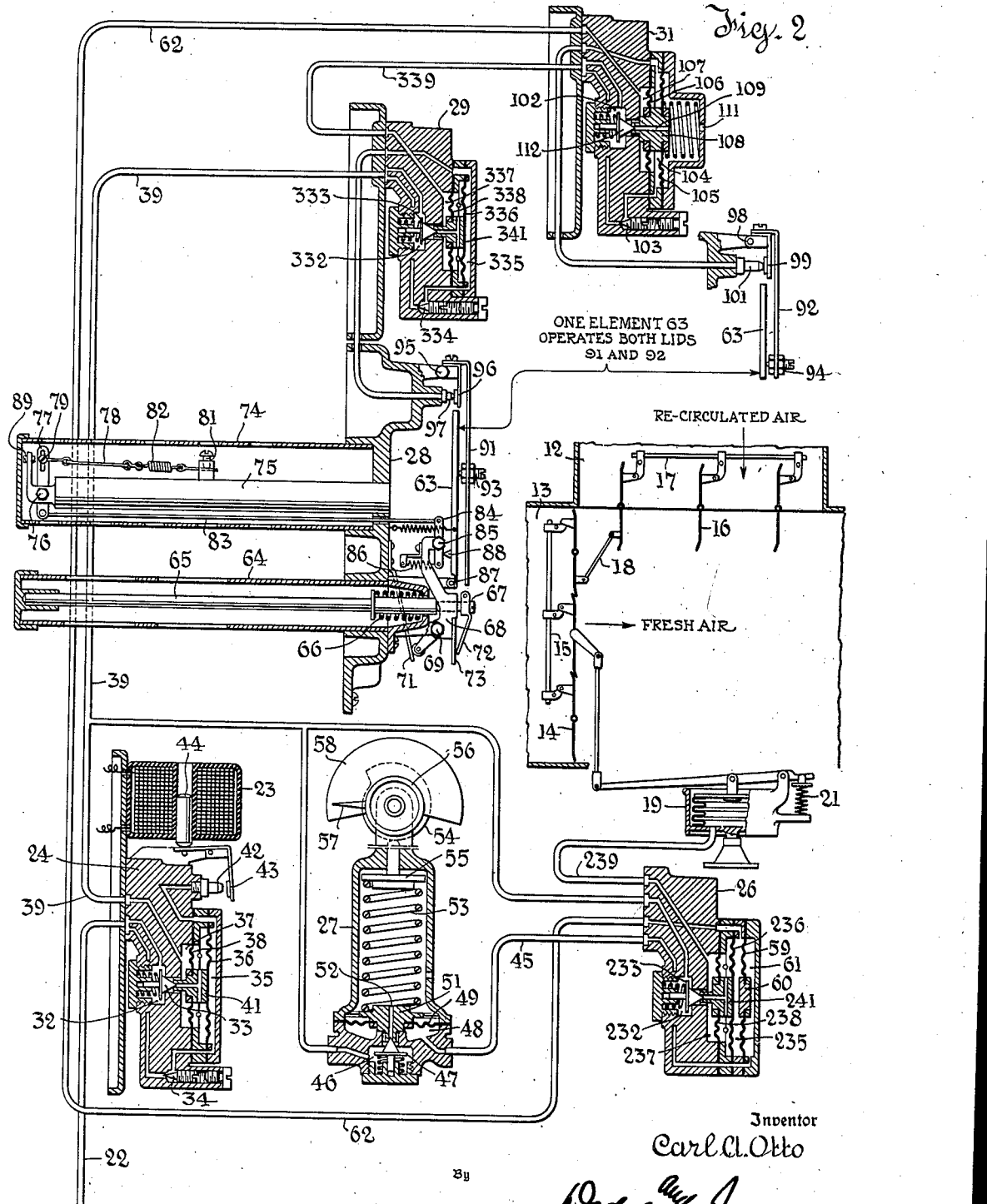
Fig. 2 is a sectional view somewhat diagrammatic in character showing the control mechanism used in Fig. 1 with connections.

Referring now to Fig. 2, the various components above generally identified as making up the control system will be found shown in section and identified by the reference numerals used in Fig. 1, applied to the body or housing where possible.

The relay valve 24 fed by line 22 is the relay of the patent to Otto 1,500,260, July 8, 1924, except that the lid of the leak port is electrically and not thermostatically actuated. Supply line 22 leads to chamber 32 in which is the combined supply and exhaust valve 33, and also past needle valve 34 to chamber 35 forward of diaphragm 36. The space 37 behind smaller diaphragm 38 is connected to system supply line 39. The space between the diaphragms is vented to atmosphere as indicated, and hub 41 connected to the centers of both diaphragms carries the exhaust port leading from space 37. This port is closed by valve 33 upon inward motion of hub 41 before valve 33 is lifted from its supply seat to admit pressure fluid to chamber 37.

The relay operates so that pressure in space 37 varies with pressure in chamber 35. Chamber 35 is vented or held at full supply pressure by the opening or closing of leak port 42 by lid 43 which closes by gravity when coil 23 is excited and armature 44 is consequently lifted. Descent of armature 44 upon deenergization of coil 23 lifts the lid from the leak port.

Hence starting of fan motor 11 supplies air to line 39 and stopping of the motor interrupts the supply and vents the line.

Gradual switch 27 receives air under pressure from a branch of line 39 and delivers it at reduced pressure to line 45 leading to the cumulator 26. Air is supplied to chamber 46 below the combined supply and exhaust valve 47. Line 45 leads from chamber 48 below diaphragm 49. This diaphragm carries at its center a hub 51 which has an exhaust port 52 extending through it. As the diaphragm moves downward valve 47 closes port 52 before the valve is forced from its supply seat.

The diaphragm moves upward in response to rising pressure in chamber 48 and is urged downward by coiled compression spring 53 which may be variably stressed by turning a spiral cam 54 to adjust the vertical position of the spring seat 55. A knob 56 is the means used to turn the cam, and the adjustment is indicated by a pointer 57 on a dial 58. This dial would be appropriately graduated but the graduations are not indicated. It follows that adjustment of the knob 56 will determine the pressure maintained in the line 45.

The cumulator 26 is identical with the relay 24 already described, except in three respects. It has no leak port corresponding to leak port 42, no needle valve corresponding to needle valve 34, and includes a third diaphragm 59 which has a central hub 60 which at times engages the hub 241. This third diaphragm is mounted on the front of the device to provide an additional chamber 61 to which the line 45 leads, as clearly shown in Fig. 2.

To avoid duplicate description those parts in the cumulator 26 which correspond to parts in the relay 24 are given the same number increased by 200. It follows that the diaphragm 59 forms the front wall of the chamber 235 and it will be observed that the pressure in chamber 235 normally functions to control the pressure in the chamber 237 and consequently the pressure in the line 239 which leads to the damper motor 19. However, if the pressure in the chamber 235 falls below the pressure established in the chamber 61 by the gradual switch 27, then the pressure established in the line 239, and consequently the damper motor 19, will be a pressure proportional to the pressure in the chamber 61.

It follows that adjustment of the knob 56 establishes a definite limit on the closing movement of the damper 14 whenever the fan is running.

The pressure in the controlling chamber 235 of the cumulator 26 is the pressure in the line 62, and this is the branch line whose pressure is controlled by the two-point comfostat 28 acting through two relays 29 and 31.

In Fig. 2 the comfostat has a single bar 63 which moves in response to the combined effects of temperature and relative humidity in the duct 13, and this single bar operates two leak port mechanisms, one for the direct acting relay 29, and the other for the reverse acting relay 31. Fig. 2 is diagrammatic to the extent that in order to show the port arrangements in a single view, the member 63 is indicated twice so as to illustrate its co-action with each of the two leak valves which it controls, but a legend has been applied indicating that this is one and the same element 63.

The numeral 28 is applied in Fig. 2 to the base element of the comfostat. This carries a temperature responsive tube 64 closed at its inner end and projecting into the duct 13. The closed inner end serves as a seat for a thermally neutral rod 65 preferably constructed of an alloy known in the trade as "Invar." Thrust engagement with the closed end of the tube 64 is maintained by the coiled compression spring 66 and the forward end of the bar 65 is guided in base 28 and acts in thrust against a screw 67 threaded into lever 68. This lever is pivoted at 69 and urged to swing in a counter-clockwise direction by the leaf spring 71 reacting against a roller carried by an arm on the lever 68 as shown. A pointer 72 coacting with the dial 73 indicates the adjustment.

Also projecting rearwardly from the base 28 and into duct 13, is a slotted tube 74 which serves to protect the humidity responsive element. It encloses a neutral bar 75 upon the end of which is pivoted at 76 a lever 77. A piece of animal membrane or other material 78 capable of increasing in length upon increase of atmospheric relative humidity has a radially adjustable connection 79 with the upper end of the lever 77. It is adjustably connected by a clamp 81 with the neutral support 75. A coil tension spring 82, wound with its coils in contact, is interposed between the sensitive element 78 and the clamp 81 to prevent over-stressing of the membrane 78 without disturbing the transmission of motion at all normal stresses. The lower end of the lever 77 is connected by a wire link 83 with one end of a lever 84 which is pivoted at 85 on the lever 68 and which is urged to swing in a clockwise direction by a light tension spring 86.

It follows that the position of the lever 84 is determined by the simultaneous instantaneous positions of the levers 68 and 77, and since these vary in response to temperature and relative humidity, as will be obvious, the position of the lever 84 is a function of the cumulative effect of temperature and relative humidity.

Temperature adjustments may be made by turning the screw 67, but the degree of participation of temperature in the combined result is not adjustable. An adjustment of relative humidity response can be made at the clamp 81, and the participation of relative humidity in the combined result can be changed within limits by shifting the connection 79 to vary the effective length of the upper end of lever 77. The lever 63 already mentioned, is fulcrumed at 87 and has a boss 88 which is in thrust engagement with the lever 84. Consequently, the position of the lever 63 varies with the cumulative effect of temperature and humidity in the fresh air duct 13. The nature of the adjustments has been explained and desirable adjustments will be elaborated hereafter.

It is sometimes desirable to limit the response of the humidity element to rising relative humidity and this result may be secured by setting an adjustable stop screw 89 which coacts with the lever 77. In the present device, the screw 89 is usually set in an inactive position.

The lever 63 is relatively wide and coacts with the two parallel levers 91 and 92, each of which has an adjustable thrust lug 93 and 94, respectively. These may be shifted vertically along the lever 91 or 92, as the case may be, to vary the motion relation between the single lever 62 on one hand and levers 91 and 92 on the other hand. For the arrangement used, see the corresponding parts 63a, 91a, 92a, etc. in Fig. 4. The lugs 93, 94 may also be adjusted in direction transverse to their levers. The lever 91 is pivoted at 95 and carries a valve element 96 which controls the leak port 97 of direct-acting relay 29. Similarly, the lever 92 is fulcrumed at 98 and carries a valve element 99 which coacts with the leak port 101 of the reverse acting relay 31.

The relay 29 is identical with relay 24 and its components are given the same numbers increased by 300. This applies to all components other than the leak port, it being understood that the leak port 97 of relay 29 is functionally similar to the leak port 42 of the relay 24. The relay 29 is supplied with air by a branch of the system supply line 39 and the branch line 339 leading from the relay 29 leads to the supply connection of the reverse acting relay 31.

Reverse acting relay 31 is constructed in general accordance with the patent to Otto 1,726,409, Aug. 27, 1929 so that only a very brief description will be required. The supply connection 339 leads to the supply chamber 102 and also past the needle valve 103 to the chamber 104 between the larger forward diaphragm 105 and the small or rear diaphragm 106. The chamber 107 at the rear of the smaller diaphragm is connected with the line 62 which is the line leading to the chamber 235 of the cumulator 26. Pressure in this chamber 107 is controlled by motion of the diaphragms 105 and 106. These diaphragms carry at their centers a hub 108 through which leads an axial exhaust port 109. This port leads to the space forward of the forward diaphragm 105 and this space is vented to atmosphere at 111. A coil compression spring urges the diaphragm assembly inward. Port 109 is closed by the combined supply and exhaust valve 112 before this valve is forced from its supply seat. Functionally, the relay 31 resembles the relay 29 except that the pressure relation is reversed. Rising pressure in the chamber 104 of the reverse acting relay causes a reduction of pressure in the branch line 62, whereas in the direct acting relay 29, rising pressure in the chamber 335 causes rising pressure in the branch line 339.

Figs. 3 and 4 show a modified arrangement for securing a definite minimum quantity of fresh air. Parts essentially similar to parts in Figs. 1 and 2 are given the same reference numerals with the letter *a*.

Fresh air dampers 14a control only the major portion of fresh air duct 13a. The remainder is controlled by an independent damper 113 operated by motor 114, with return spring 115, directly connected with line 39a. Thus the gradual switch 27 and cumulator 26 of Figs. 1 and 2 become unnecessary and are omitted. Branch line 62a is directly connected to motor 19a (instead of operating on motor 19 through cumulator 26, as in Fig. 1).

Fig. 4 includes a face view of the two-point comfostat 28a and illustrates how the lever 63a underlies the levers 91a and 92a and how the thrust lugs 93a and 94a are adjustable in the direction of the lengths of their levers and also in direction transverse to levers 91a and 92a, respectively.

The two schemes operate according to the same principle. In Figs. 3 and 4 the minimum fresh air damper 113 is open whenever the fan runs, but no adjustment of the minimum fresh air damper is provided. The opening of the minimum fresh air damper 113 does not entail partial closure of the recirculation dampers.

Except for the differences just mentioned, the arrangement of Figs. 1 and 2 and the arrangement of Figs. 3 and 4 operate in the same way, and their operation will now be described on the basis of Fig. 2.

Rising temperature and rising relative humidity each cause lever 63 to swing counterclockwise (i. e., in a direction to close leak ports 97 and 101). Their effect is cumulative.

Assume a condition such that temperature is low and the plant is operating to heat and humidify. On rising characteristics of outdoor air a point will be reached at which valve 96 starts to throttle port 97.

The parts are so arranged, by adjustment of thrust pins 93 and 94 transverse to levers 91 and 92, that 97 will be closed before throttling of 101 commences. The rate of change of throttling of each leak port with reference to the change of condition can be adjusted by shifting pins 93 and 94 longitudinally on levers 91 and 92. The participation of humidity can be adjusted at 79. Temperature settings can be made by turning screw 67 and humidity adjustments can be made at 81. These adjustments can be made according to the exact control desired.

As port 97 is throttled more and more, relay 29 establishes a corresponding rising pressure in line 339, reaching 15 pounds gage (the supply pressure in line 22) when port 97 is closed. Since port 101 is fully open while port 97 is being progressively throttled, valve 112 is open continuously and the rising pressure in line 339 is also established in line 62 and hence in chamber 235 of the cumulator 26. The cumulator establishes a corresponding pressure in motor 19.

It follows that dampers 14 open and dampers 16 close progressively so that 14 are wide open and 16 closed tight when valve 96 has just closed port 97.

As outside conditions continue to rise, and preferably after an interval coextensive with that in which conditioner 7 would normally be inactive, valve 99 will start to throttle and then gradually close port 101. Rising pressure in chamber 104 causes relay 31 to reduce pressure in line 62. This effect transmitted through cumulator 26 causes reduction of pressure in motor 19 so that dampers 14 and 16 are gradually restored to the position of Fig. 2.

Consequently, between seasons, when the conditioner is inactive, fresh air is used. Further in heating and cooling zones where only moderate heating or cooling is required, fresh air is used in quantity larger than the minimum, the excess amount so used varying inversely with respect to the need for heating or cooling.

Both the structures so far described have the important characteristic of adjusting the dampers in response to the combined effect of humidity and temperature of the outside air. The participation of humidity in the control is somewhat more important under summer or cooling conditions than it is under winter or heating conditions, because commercial refrigerating systems are somewhat less efficient than commercial heating systems, and the dehumidification load is a substantial part of the summer conditioning load.

Consequently, although the participation of humidity in the damper control is considered to be desirable under all conditions, it can in some cases be dispensed with as to the heating phase of the system.

To illustrate this possibility there is shown in Figs. 5 and 6 a system in which the fresh air dampers are opened gradually under the control of outside air temperature alone as that temperature approaches a value at which heating is unnecessary, and the fresh air dampers are then gradually closed in response to the combined effect of temperature and humidity as the demand for summer conditioning commences and increases through a moderate portion of the total capacity.

While the latter portion of the control could be effected by a comfostat such as that shown in Figs. 1 to 4 inclusive, advantage has been taken of the opportunity to show the possibility of using in lieu of a comfostat a readjustable thermostat readjusted by a separate humidostat or a device responsive to relative humidity.

In Figs. 5 and 6 the conditioner, fan, fan motor, dampers and the control of motive air to the system are all arranged as shown in Fig. 3 but might, without the exercise of invention, be arranged as shown in Fig. 1. Accordingly, parts in Figs. 5 and 6 which are identical with parts in Figs. 3 and 4 are given the same reference numerals with the distinguishing letter b. To avoid duplicate description it is mentioned here that the parts 7b to 25b inclusive and the part 39b correspond to the parts 7a to 25a and the part 39a in Figs. 3 and 4. Also, the parts 113b to 115b in Figs. 5 and 6 correspond to the parts 113 to 115 in Figs. 3 and 4.

The control elements in Fig. 5 will first be generally identified. 116 is an insertion thermostat with relay 117 whose function is to control the dampers under heating or winter conditions. The relay 117 is connected through the reverse acting relay 118 of a readjustable thermostat 119 to the damper motor 19b. An insertion humidostat 121 controls through its relay 122 the readjustment of the thermostat 119. These parts are identified in Fig. 6 by the same reference numerals applied to the housings of the various devices.

As the control apparatus shown in Fig. 6 is made of standard commercial units, many of which are shown in other figures, only a very brief description will be given. The relays 117 and 122 are both direct acting relays identical with the relay 29 of Fig. 2 while the relay 118 is a reverse acting relay identical with the relay 31 of Fig. 2.

The insertion thermostat 116 has a couple made up of a thermally expansible tubular element 123 and a relatively neutral (Invar) rod 124. The rod 124 acts through an ordinary adjusting thrust screw to swing the lever 125. This acts through the variable lever connection 126 on the arm 127 which actuates the lid 128 of the leak port 129 of relay 117. The branch connection 131 of relay 117 leads to the supply connection of the reverse acting relay 118 and the branch line 132 of relay 118 leads to the damper motor 19b as will be readily understood.

The characteristic of the thermostat 116 is such that on rising temperature the leak port 129 is closed, and since relay 117 is direct acting, rising temperature produces rising pressure in the branch line 131.

The readjustable thermostat 119 is of the type shown in the patent to Otto, 2,009,674, July 30, 1935, and need be only generally discussed. The thermal couple comprises a tubular expansible element 133 and a neutral element 130 which react through an adjusting thrust screw on the lever 134. This shifts through the leverage adjusting thrust member 135 the lever 136. This lever 136 carries the lid 137 which coacts with leak port 138. The leak port 138 is connected by a flexible tube 139 with the controlling chamber of the reverse acting relay 118. The characteristic is such that on rising temperature the leak port 138 is closed, and since the relay 118 is reverse acting this entails a lowering of the pressure in line 132 leading to the damper motor.

Readjustment is effected by changing the pressure in a bellows motor 141 to shift a lever 142 which carries a cam at 143. This cam shifts a lever 144 on which the leak port 138 is mounted. The mechanism generally indicated at 145 is to adjust the angularity of the cam 143 and thereby modify the rate of readjustment with reference to change of pressure in the bellows motor 141. The apparatus is disclosed in detail in the patent mentioned. Its general functions alone are here involved and have been described merely in sufficient detail to permit an understanding of the invention.

The pressure in the bellows 141 is controlled by the humidostat 121. Element 146 is merely a perforated protecting tube and the member 147 is a neutral hollow support. The fulcrum 148 of the lever 149 is carried on the end of support 147, and a stop screw 151 adjustable at the front of the instrument limits the counter-clockwise motion of lever 149 which is drawn against the stop screw by spring 152. This spring will yield to prevent over-stressing of the humidity responsive element 153, but does not yield in the normal operation of the device. Element 153 is connected to the other end of the lever 149 and also to the lever 154 which is fulcrumed at 155 and biased by spring 156 to hold the responsive element in tension. Variations in length of the member 153 cause shifting of the lever 154. Adjustment may be effected by turning screw 151 whose adjustment is indicated by a pointer and dial shown in the drawings.

The lever 154 reacts in thrust with a lever 156, the thrust lug being shown at 157. The lever 156 carries a lid 158 which controls the leak port 159 of the relay 122. The lid gravitates in a closing direction. Rise of relative humidity causes the member 153 to expand. This causes the lid 158 to move in a direction to close the leak port and, since relay 122 is direct acting, causes a rise of pressure in the branch line 161 which leads to the bellows 141. This rise of pressure shifts leak port 138 toward lid 137. Consequently, rise of temperature and rise of humidity both tend to cause closing of leak port 138. In other words, their effect is cumulative just as it was in the comfostat of Figs. 1 to 4 inclusive.

Since the leak port 138 controls the reverse acting relay 118 the effect of rising temperature or humidity or both affecting the humidostat 121 and the thermostat 119 is to cause falling pressure in the branch line 132.

The control point of the thermostat 116 is lower than the combined control point of the instruments 119 and 121. Consequently, starting with a condition in which the leak ports 129 and 138 are both open as they would be during the heating season, rising temperature affecting thermostat 116 will ultimately commence closure of port 129. This will cause rise of pressure in branch line 131 which will be communicated through branch line 132 to damper motor 19b (because leak port 138 is open and the reverse acting relay 118 then operates to establish pressure in the line 132).

With the instruments properly adjusted leak port 129 will be completely closed at or about the time the need for heating ceases. When the port is fully closed supply pressure is delivered through branches 131 and 132 to the damper motor 19b. Consequently, the fresh air dampers are open.

As outside air temperature or humidity or both continue to increase, a point will be reached at which lid 137 starts to throttle leak port 138. This causes the reverse acting relay 118 to take control and reduce the pressure in its branch line 132. Thus the dampers start reverse movement and when the leak port 137 is completely closed the relay 118 will completely vent line 132 so that the fresh air dampers 14b will be closed and the return air dampers 16b will be wide open.

At such time the auxiliary fresh air dampers 113b supply the desired minimum quantity of fresh air.

In the above description it will be observed that the device of Figs. 5 and 6 involves the same general operative principles as the devices of the other figures. This embodiment, however, operates in the heating range in response to temperature alone and in the cooling range in response to the combined effect of temperature and humidity.

The important aspect of the inventive concept is the control of the dampers in response to the combined effect of temperature and humidity and particularly such control under cooling conditions.

Three different embodiments of the broad concept have been shown, and various others are possible within the scope of the invention. The specific structures illustrated are to be taken as exemplary and not limiting.

What is claimed is:

1. The combination of air conditioning means adapted to cool and dehumidify and including damper means for varying the proportions of fresh and recirculated air supplied to the conditioning means; motor means for shifting said damper means; and means progressively responsive to the combined effect of temperature and relative humidity of the fresh air for energizing said motor means, the parts being so arranged that as said combined effect rises the proportion of fresh air will be reduced.

2. The combination of air conditioning means adapted to cool and dehumidify and including damper means for varying the proportions of fresh air and recirculated air supplied to the conditioning means; motor means for shifting said damper means; an element which responds progressively to dry bulb temperature of the fresh air; another element which responds progressively to the relative humidity of the fresh air; and means for energizing said motor means in accordance with the combined response of said two elements, the parts being so arranged that the proportion of fresh air will be reduced in response to rising temperature and relative humidity.

3. The combination of air conditioning means adapted to cool and dehumidify and including damper means for varying the proportions of fresh air and recirculated air supplied to the conditioning means; motor means for shifting said damper means; an element which responds progressively to dry bulb temperature of the fresh air; another element which responds progressively to the relative humidity of the fresh air; means for adding the response of said elements to each other to produce a combined response, said means including proportioning means to vary the relative participation of dry bulb temperature and relative humidity in said combined response; and means controlled by said combined response for energizing said motor means.

4. The combination of air conditioning means adapted to cool and dehumidify and including damper means for varying the proportions of fresh air and recirculated air supplied to the conditioning means; motor means for shifting said damper means; an element which responds progressively to dry bulb temperature of the fresh air; another element which responds progressively to the relative humidity of the fresh air; means for adding the response of said elements to each other to produce a combined response, said means including proportioning means to vary the relative participation of dry bulb temperature and relative humidity in said combined response; means controlled by said combined response for energizing said motor means; and adjustable means for imposing an upper limit on the participation of relative humidity in said combined response.

5. The method of controlling the proportions of fresh and recirculated air supplied to an air conditioner which comprises separately determining the departure of dry bulb temperature and relative humidity of fresh air from a chosen value and varying the proportion of fresh air supplied to the conditioner in inverse relation to the variations of the sum of said departures.

6. The combination of air conditioning means adapted to cool and dehumidify and including damper means for varying the proportions of fresh and recirculated air supplied to the conditioning means; motor means for shifting said damper means; and means progressively responsive to the combined effect of temperature and relative humidity of the fresh air for variably energizing said motor means, the parts being so arranged that as said combined effect rises the proportion of fresh air will be gradually reduced at a rate such that the practicable minimum supply of fresh air will be attained before the conditioner is required to operate at full capacity.

7. The combination of conditioning means adapted to heat and humidify in winter and to cool and dehumidify in summer, said means including reversely acting damper means for supplying variable proportions of fresh and recirculated air to the conditioning means; motor means for actuating said damper means; controlling means responsive to the combined effect of dry bulb temperature and relative humidity of the outside air; and means for subjecting said motor means to control by said controlling means in two relatively reverse senses, the arrangement being such that in a range in which outside temperature and relative humidity approximate the desired inside values, the maximum proportion of fresh air will be supplied and as said outside conditions depart in either direction from said range the proportion of fresh air will be diminished.

8. The combination of conditioning means adapted to heat and humidify in winter and to cool and dehumidify in summer, said means including reversely acting damper means for supplying variable proportions of fresh and recirculated air to the conditioning means; progressively acting motor means for actuating said damper means; progressively acting controlling means responsive to the combined effect of dry bulb temperature and relative humidity of the outside air; and means for subjecting said motor means to control by said controlling means in two relatively reverse senses, the arrangement being such that in a range in which outside temperature and relative humidity approximate the desired inside values, the maximum proportion of fresh air will be supplied and as said outside conditions depart in either direction from said range the proportion of fresh air will be progressively diminished to a minimum value which is attained before the conditioning means is required to operate at full capacity.

9. The combination of conditioning means adapted at least to heat in winter and to cool and dehumidify in summer, said means including reversely acting damper means for supplying variable proportions of fresh and recirculated air to the conditioning means; motor means for actuating said damper means; controlling means responsive to the combined effect of dry bulb temperature and relative humidity of outside air above a chosen value and at least to dry bulb temperature of outside air below a second somewhat lower chosen value; and means for subjecting said motor means to control by said controlling means in two relatively reverse senses, the arrangement being such that between said chosen values maximum proportion of fresh air will be supplied to the conditioner, and as the combined effect of temperature and relative humidity rises above the first chosen value, and also as at least temperature falls below the second chosen value the proportion of fresh air will be diminished.

10. The combination of conditioning means adapted at least to heat in winter and to cool and dehumidify in summer, said means including reversely acting damper means for supplying variable proportions of fresh and recirculated air to the conditioning means; progressively acting motor means for actuating said damper means; progressively acting controlling means responsive to the combined effect of dry bulb temperature and relative humidity of outside air above a chosen value and at least to dry bulb temperature of outside air below a second somewhat lower chosen value; and means for subjecting said motor means to control by said controlling means in two relatively reverse senses, the arrangement being such that between said chosen values maximum proportion of fresh air will be supplied to the conditioner, and as the combined effect of temperature and relative humidity rises above the first chosen value, and also as at least temperature falls below the second chosen value the proportion of fresh air will be progressively diminished to a minimum value which is attained before the conditioning means is required to operate at full capacity.

11. The combination of conditioning means adapted to heat and humidify in winter and to cool and dehumidify in summer, said means including reversely acting damper means for supplying variable proportions of fresh and recirculated air to the conditioning means, a source of pressure fluid; biased pressure motor means for shifting said damper means; an instrument responsive to the combined effects of temperature and humidity of fresh air, and including two modulating valves which are operated serially in two ranges of said combined effect; and two gradual acting relays each controlled by a corresponding one of said modulating valves, one of said relays being direct acting and the other reverse acting and the two being connected in series so that one receives pressure fluid from the source and delivers it to the second which is connected to control pressure in said motor.

12. The combination with the structure of claim 11 of a relay interposed between said second relay and said motor and forming the operative connection therebetween, the last named relay being supplied with pressure fluid from said source, and including an abutment shiftable to limit the pressure delivered by the relay; and means for variably loading said abutment.

13. The combination of conditioning means adapted to heat in winter and to cool and dehumidify in summer, said means including reversely acting damper means for supplying variable proportions of fresh and recirculated air to the conditioning means; a source of pressure fluid; biased pressure motor means for shifting said damper means; control means affected by the fresh air and responsive to temperature and relative humidity in the higher of two ranges, and at least to temperature in the lower of said two ranges, said control means including two modulating valves which are operated each in one of said two ranges; and two gradual acting relays each controlled by a corresponding one of said modulating valves, one of said relays being direct and the other reverse acting, and the two being connecteed in series so that one receives pressure fluid from said source and delivers it to the other which is connected to control pressure in said motor.

14. The combination of conditioning means adapted to heat and humidify in winter and to cool and dehumidify in summer, said means including reversely acting damper means for supplying variable proportions of fresh and recirculated air to the conditioning means; a source of pressure fluid; biased pressure motor means for shifting said damper means; an instrument responsive to the combined effects of temperature and humidity of fresh air, and including two modulating valves connected to control said motor means, the first of said two valves having a lower control point than the second, and so arranged that each acts to supply pressure fluid to said motor means when said combined effect is in the range between the control points of said valves, and they act selectively to vent pressure fluid from said motor means as said combined effect passes outside said range in one or the other direction.

CARL A. OTTO.